J. M. STONE.
Shaft-Couplings.

No. 141,296. Patented July 29, 1873.

Witnesses.
F. K. Rogers
S. A. Frud

Inventor.
Joseph M. Stone

UNITED STATES PATENT OFFICE.

JOSEPH M. STONE, OF NORTH ANDOVER, MASSACHUSETTS.

IMPROVEMENT IN SHAFT-COUPLINGS.

Specification forming part of Letters Patent No. 141,296, dated July 29, 1873; application filed July 22, 1872.

*To all whom it may concern:*

Be it known that I, JOSEPH M. STONE, of North Andover, county of Essex and State of Massachusetts, have invented an Improved Coupling for Connecting Shafts or Rods, of which the following is a specification:

My improved coupling is made in two halves, divided longitudinally, with the parts so held together as to unite the shafts with great firmness, and present a circular form on its exterior, in all parts, with nothing projecting therefrom to catch any object while revolving. My improvement consists in forming upon the hub or sleeve of the coupling one or more enlarged belts, of such diameter and breadth that recesses may be formed therein upon either side of the shaft, as is shown, of sufficient size and depth to receive the heads and nuts of the bolts that hold the two parts of the sleeve together, within the circle of the exterior and in connection therewith. A band of wrought-iron, which is fitted upon the outside of said belt, further holds the two halves firmly together and covers the recesses for the bolts, so that the coupling in all parts presents a smooth and unbroken surface.

Figure 1:
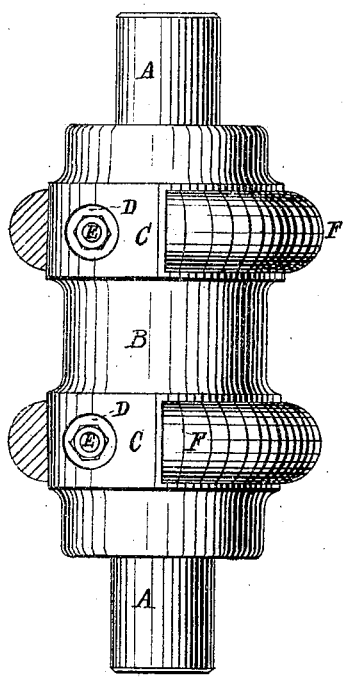
Figure 2:
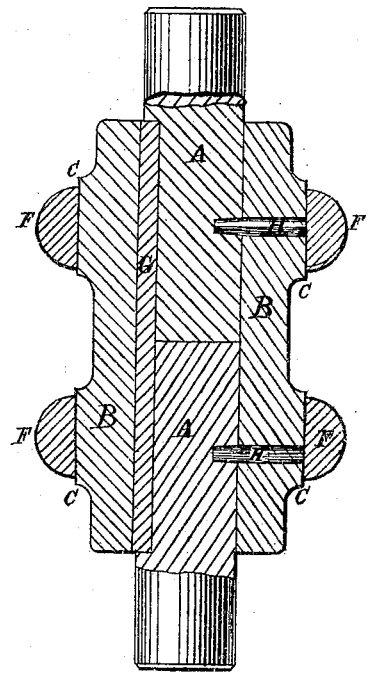
Figure 3:
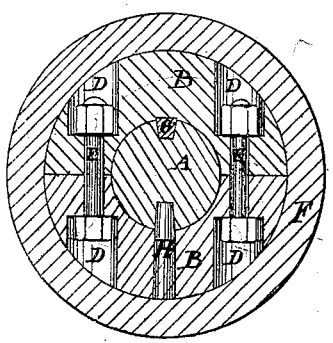

Figure 1 is an elevation with the two exterior rings part in section. Fig. 2 is a longitudinal section through the axis; and Fig. 3 is a transverse section through the center of one of the belts and its attachments.

A A represents the shafts, and B B the two halves of the sleeve of the coupling, which extends on to each shaft as far as may be desired. C C are belts or enlargements of the sleeves, made circular on the exterior, and of sufficient diameter to admit of recesses D D, &c., being formed in them to receive the heads and nuts of the bolts E E, &c., which confine the two parts of the sleeve together, and have the heads and nuts come within the circle, and also have sufficient metal beneath them to give the proper strength to the connection. F F are wrought-iron bands, made with any appropriate form of cross-section, which are fitted upon the outside of the belts C C, and made to embrace them firmly and cover the recesses D, so that the coupling presents a smooth exterior throughout. The fit of each band is made slightly tapering toward the end of the coupling, so that the band may be readily driven on and off. G is a spline-key in one half of the sleeve, to prevent the coupling from turning on the shaft, and H H are pins or dowels in each shaft, to prevent them from drawing apart.

I do not claim making the coupling in two parts divided longitudinally, as that is old; but

I claim—

The combination, with the two parts of the sleeve, of the recesses D and the band F, substantially as described.

Executed at Boston this 19th day of July, 1872.

J. M. STONE.

Witnesses:
F. K. ROGERS,
S. A. WOOD.